United States Patent
Frett et al.

(10) Patent No.: US 7,607,722 B2
(45) Date of Patent: Oct. 27, 2009

(54) ROLL-OVER PROTECTIVE STRUCTURE FOR A WORK VEHICLE WITH REMOVABLE PORTION FOR AIR TRANSPORT

(75) Inventors: James M. Frett, Peosta, IA (US); Owen Ziemer, Eyota, MN (US); Ravi Modukuri, Dubuque, IA (US)

(73) Assignee: Deere & Company, Moline, IL (US)

( * ) Notice: Subject to any disclaimer, the term of this patent is extended or adjusted under 35 U.S.C. 154(b) by 362 days.

(21) Appl. No.: 11/553,684

(22) Filed: Oct. 27, 2006

(65) Prior Publication Data

US 2008/0048426 A1  Feb. 28, 2008

Related U.S. Application Data

(60) Provisional application No. 60/840,549, filed on Aug. 28, 2006.

(51) Int. Cl.
*B60R 21/13* (2006.01)

(52) U.S. Cl. .............................. 296/190.04; 180/89.12; 280/756

(58) Field of Classification Search ............ 296/190.03, 296/190.08, 190.11, 205; 180/89.12, 311; 280/784, 785, 756
See application file for complete search history.

(56) References Cited

U.S. PATENT DOCUMENTS 6,582,010 B2 * 6/2003 Sakyo et al. ............ 296/190.08
7,048,082 B2 * 5/2006 Mori et al. ................ 180/89.12

* cited by examiner

*Primary Examiner*—Lori L Lyjak
(74) *Attorney, Agent, or Firm*—Taylor & Aust, P.C.

(57) ABSTRACT

A work vehicle includes a vehicle frame and a roll-over protective structure mounted to the frame. The roll-over protective structure includes a plurality of upright support posts supporting a roof. Each support post includes a lower post section and an upper post section detachably coupled together in an end-to-end arrangement.

39 Claims, 5 Drawing Sheets

ROLL-OVER PROTECTIVE STRUCTURE FOR A WORK VEHICLE WITH REMOVABLE PORTION FOR AIR TRANSPORT

CROSS REFERENCE TO RELATED APPLICATIONS

This is a non-provisional application based upon U.S. provisional patent application Ser. No. 60/840,549, entitled "ROLL-OVER PROTECTIVE STRUCTURE FOR A WORK VEHICLE WITH REMOVABLE PORTION FOR AIR TRANSPORT", filed Aug. 28, 2006.

FIELD OF THE INVENTION

The present invention relates to work vehicles, and, more particularly, to roll-over protective structures for such work vehicles.

BACKGROUND OF THE INVENTION

A work vehicle such as a motor grader, bulldozer or the like typically includes a roll-over protective structure (ROPS) to comply with governmental safety regulations. In the case of a work vehicle having an enclosed operator cab, the ROPS is typically incorporated into the framework of the cab. More particularly, the cab typically includes corner posts supporting an overhead roof, and safety glass spanning between the corner posts allowing visibility by an operator. The corner posts are single piece corner posts which are sized and configured to withstand roll-over requirements. The one piece nature of the corner posts results in the work machine having a fixed overall height.

Most new work vehicles such as agricultural tractors that do not include an operator cab have a ROPS in the form of an upside down U-shaped frame which extends above the height of the operator when seated. To allow the tractor to be used in buildings having lower doorways or along overhanging tree limbs, the ROPS may be folded rearwardly about mid height of the ROPS, thereby decreasing the effective height of the ROPS. Such an arrangement obviously cannot be used to fold over an operator cab.

For one application, it is desirable for a motor grader unit to be field-altered such that the overall height of the machine can be less than 102 inches tall. The machine must be able to be operated in this condition so that it can be driven onto a cargo plane for air transport. For example, when such a work machine is used in support of military operations, it may be desirable to load the work machine onto a C-130 air cargo transport plane for transport to a selected location. The rear loading ramp and door opening have a maximum height of 102 inches, resulting in the overall machine height requirement specified above. Parts of the machine can be disassembled and shipped on a skid separate from the rest of the machine for this operation. When the machine is fully reassembled, it must meet ROPS safety requirements according to ISO 3471.

What is needed in the art is an operator cab having a ROPS which may be quickly and easily altered to decrease the overall height of the vehicle, particularly for use during transport of the work vehicle.

SUMMARY OF THE INVENTION

The present invention provides a ROPS structure for an operator cab in a work vehicle which can be split at a desired vertical height for transport, and reassembled in the field for subsequent use.

The present invention in one form is directed to a work vehicle including a vehicle frame and a roll-over protective structure mounted to the frame. The roll-over protective structure includes a plurality of upright support posts supporting a roof. Each support post includes a lower post section and an upper post section detachably coupled together in an end-to-end arrangement.

The present invention in another form is directed to a work vehicle including a vehicle frame and an operator cab carried by the frame. The operator cab includes a plurality of upright support posts supporting a roof. Each support post includes a lower post section and an upper post section detachably coupled together in an end-to-end arrangement. A plurality of windows respectively span between adjacent support posts. Each window includes an upper window section and a lower window section detachably coupled together.

The present invention in yet another form is directed to a roll-over protective structure for use with a work vehicle. The roll-over protective structure includes a plurality of upright support posts supporting a roof. Each support post includes a lower post section and an upper post section detachably coupled together in an end-to-end arrangement.

DESCRIPTION OF THE INVENTION

Figure 1:
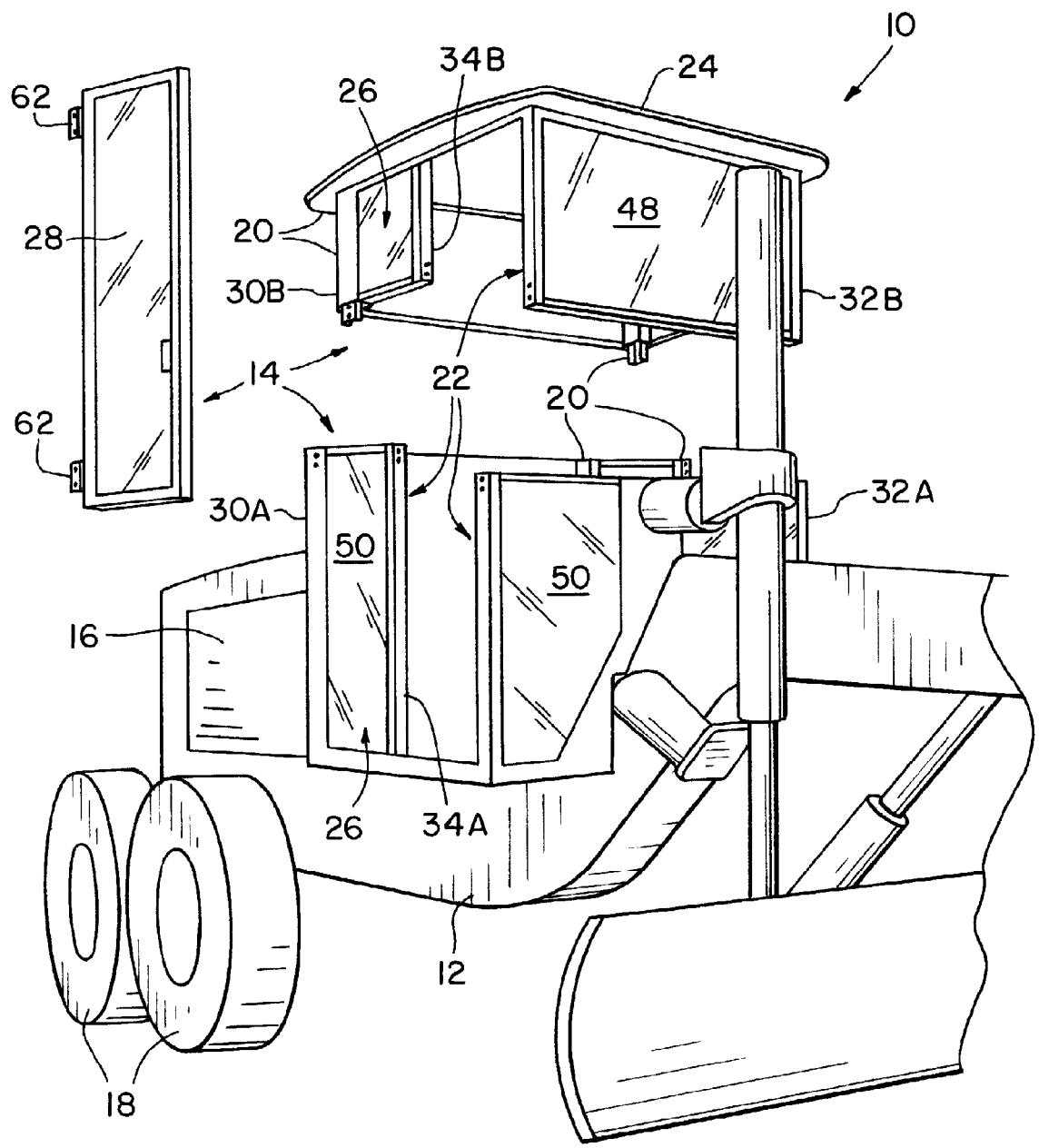
FIG. 1 is a perspective view illustrating an embodiment of a ROPS of the present invention including a removable top portion.
Figure 2:
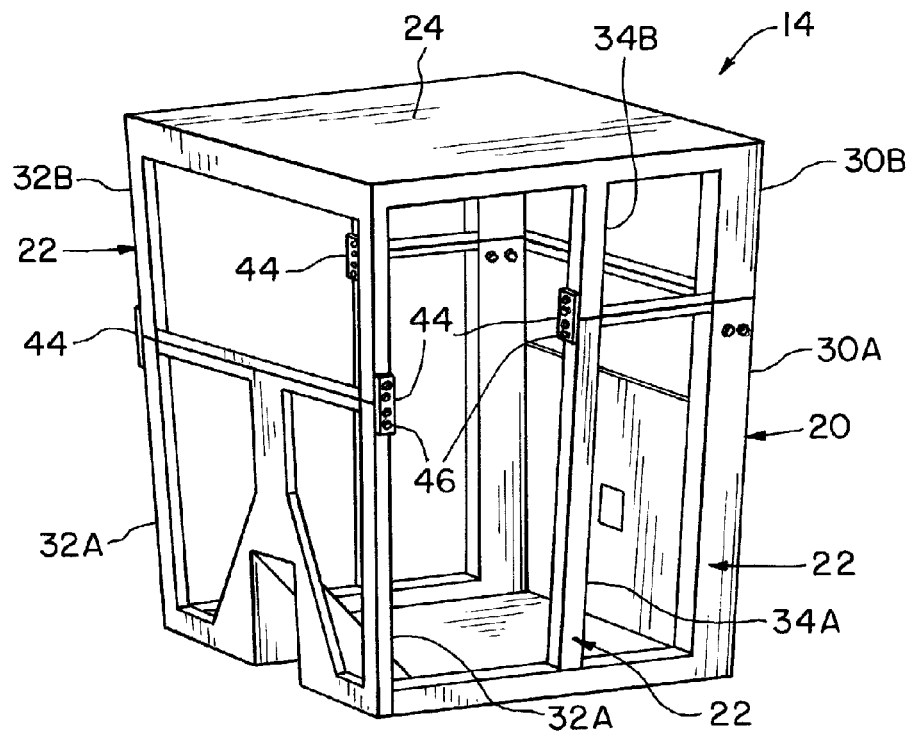
FIG. 2 is a front, perspective view of the ROPS shown in FIG. 1, with the glass removed.
Figure 3:
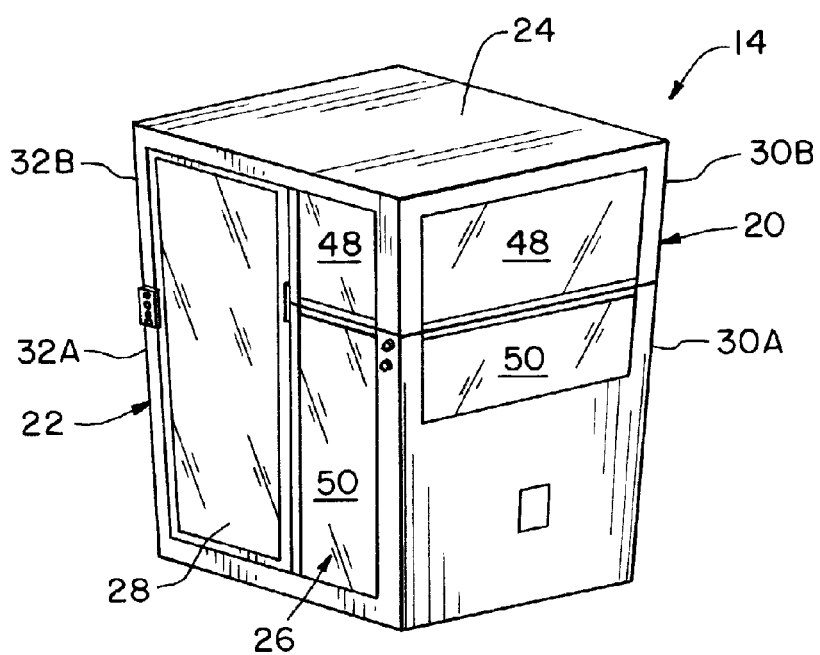
FIG. 3 is a rear, perspective view of the ROPS shown in FIGS. 1 and 2, with the glass installed.
Figure 4:
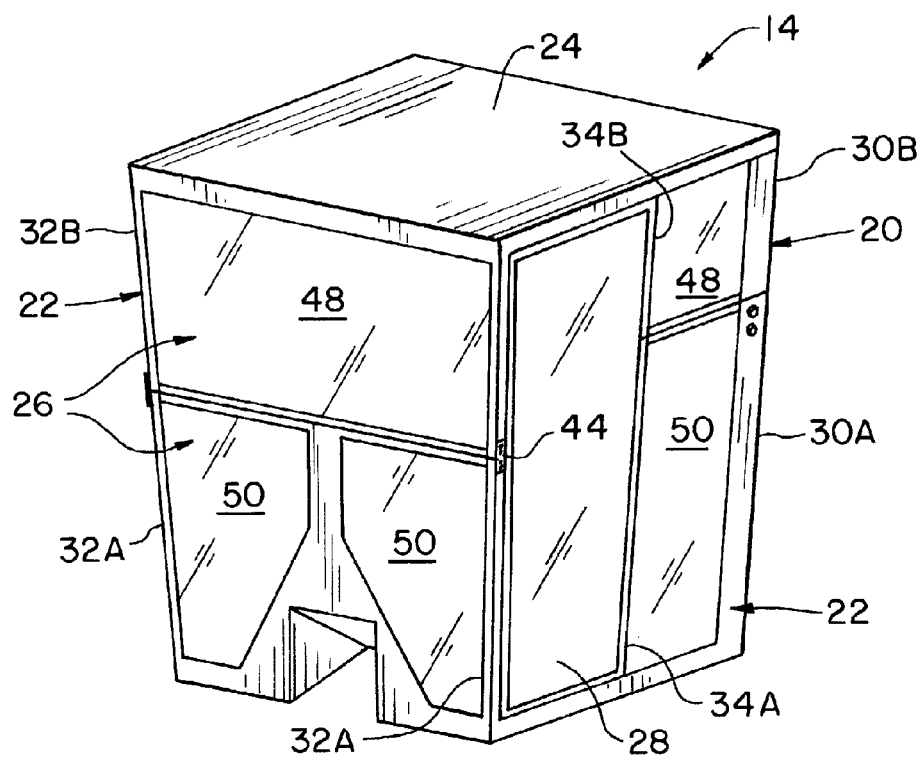
FIG. 4 is a front, perspective view of the ROPS shown in FIGS. 1-3, with the glass installed.

Referring now to the drawings, and more particularly to FIGS. 1-4, there is shown an embodiment of a work machine 10 of the present invention. Work machine 10 is in the form of a motor grader in the embodiment shown in the drawings, but may also be configured as a different type of work machine, such as a bulldozer, backhoe, agricultural tractor, track hoe, etc. Work machine 10 generally includes a vehicle frame 12 carrying an operator cab 14. Frame 12 also carries an internal combustion (IC) engine which is housed within an engine compartment 16, with the IC engine in turn providing motive force to wheels 18.

Operator cab 14 includes an integral ROPS 20 having a plurality of upright support posts 22 which support a roof 24. ROPS 20 also optionally includes a plurality of windows 26 spanning between upright support posts 22, and a pair of doors 28 which are pivotally and removably carried by a corresponding upright support post 22 on either side of ROPS 20.

Figure 5:
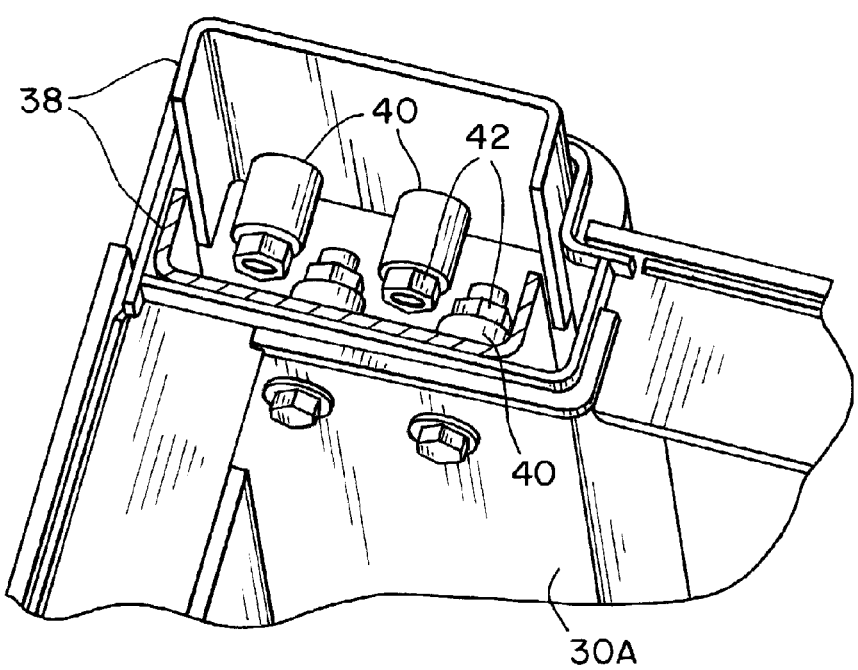
FIG. 5 is a perspective view of a vertical rear post at the rear corners of the cab, showing a pair of internal C-channel coupler plates which interconnect the top and bottom vertical rear posts.
Figure 7:
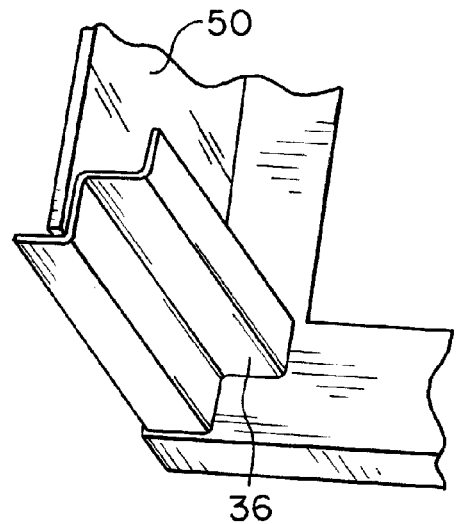
FIG. 7 is a perspective view of a vertical front post at the front corners of the cab, absent the external coupler plate which interconnects the top and bottom vertical front posts.
Figure 8:
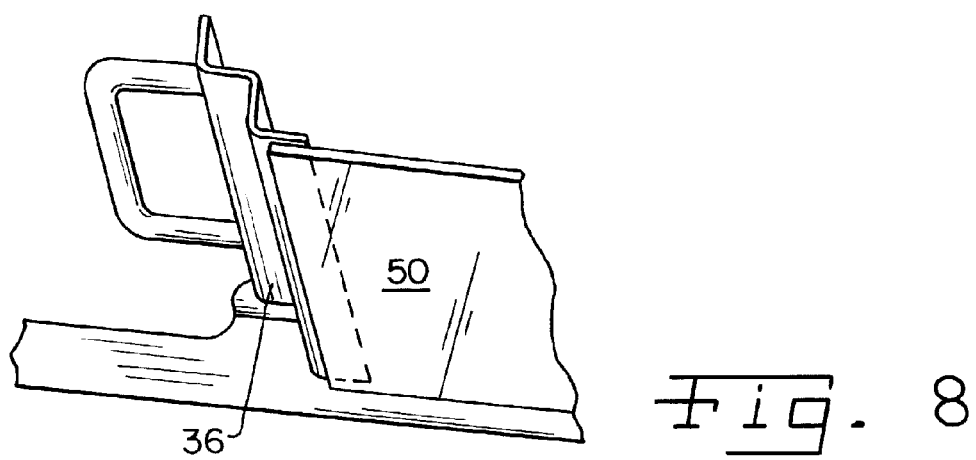
FIG. 8 is a perspective view of a vertical mid post at the rear of the access door of the cab, absent the external coupler plate which interconnects the top and bottom vertical mid posts.

Upright support posts 22 include a pair of rear corner posts 30, a pair of front corner posts 32 and a pair of door posts 34. Rear corner posts 30 have a generally rectangular cross-section as shown in FIG. 5, and are the most substantial of the various upright support posts 22 of ROPS 20. Front corner posts 32 and door corner posts 34 each have a generally W-shaped cross-section (as shown in FIGS. 7 and 8, respectively) also providing rollover strength to ROPS 20, while at the same time providing a recessed flange 36 against which a corresponding door 28 is seated when installed.

Each of rear corner posts 30, front corner posts 32 and door posts 34 have a lower post section and an upper post section which are detachably coupled together in an end-to-end arrangement. More particularly, each rear corner post 30 includes a lower post section 30A and an upper post section 30B; each front corner post 32 includes a lower post section 32A and an upper post section 32B; and each door post 34 includes a lower post section 34A and an upper post section 34B.

Figure 6:
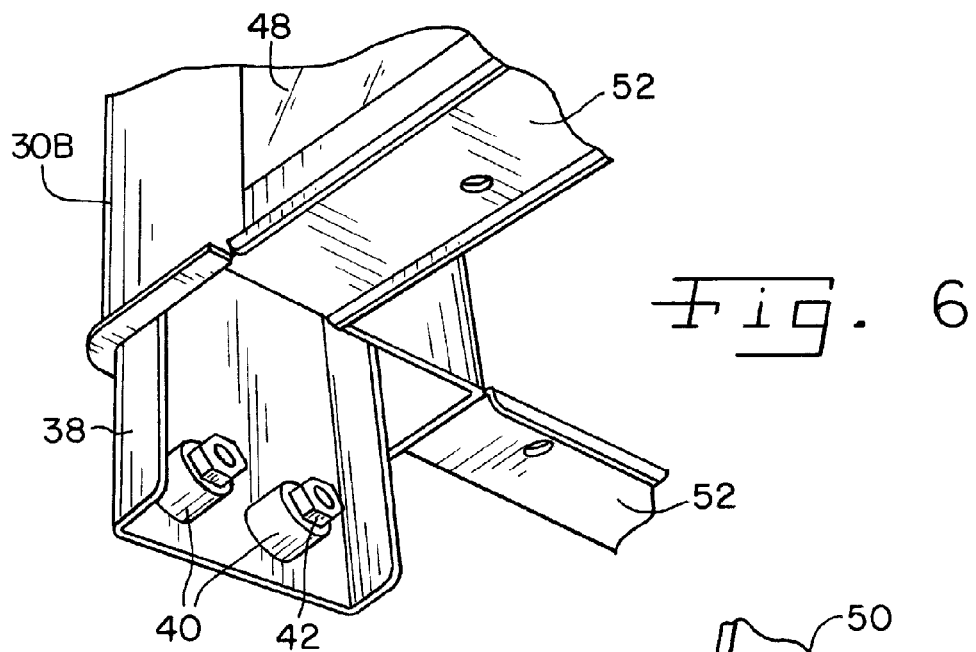
FIG. 6 is another perspective view of the C-channel coupler plate shown in FIG. 5.

Rear corner posts 30 are coupled together using C-channel coupler plates 38 which are positioned within the rectangular opening defined within rear corner posts 30. Each coupler plate 38 extends longitudinally within a corresponding lower post section 30A and upper post section 30B. In the embodiment shown in the drawings, coupler plates 38 are welded to upper post sections 30B, and bolted to lower post sections 30A (see FIGS. 5 and 6). A hollow tube section 40 is welded to the inside of coupler plate 38, and a threaded nut 42 is welded to the end of tube section 40, allowing the use of a threaded bolt through lower post section 30A. As shown in FIGS. 5 and 6, coupler plates 38, including tube sections 40 and nut 42, do not fill the entire cross-section of a corresponding corner post 30, such that air may pass through rear corner posts 30 as part of the heating and air conditioning system within operator cab 14.

Coupler plates 44 are used to detachably couple each of front corner posts 32 and door posts 34. Each coupler plate 44 is generally an elongated metal strap with four holes for receiving corresponding threaded fasteners 46, such as bolts. Each coupler plate 44 is positioned on an outside of a corresponding front corner post 32 or door corner post 34, such that two bolt holes overlie a lower post section 32A or 34A, and the other two bolt holes overlie an upper post section 32B or 34B.

The Front C-shaped coupler plate 38 is shown cutoff at the split line between lower post section 30A and upper post section 30B in FIG. 5 for the purpose of illustrating the method of mounting, but in fact is approximately twice the height shown in FIG. 5 (the same as the coupler plate 38 shown at the rear in FIG. 5).

Figure 9:
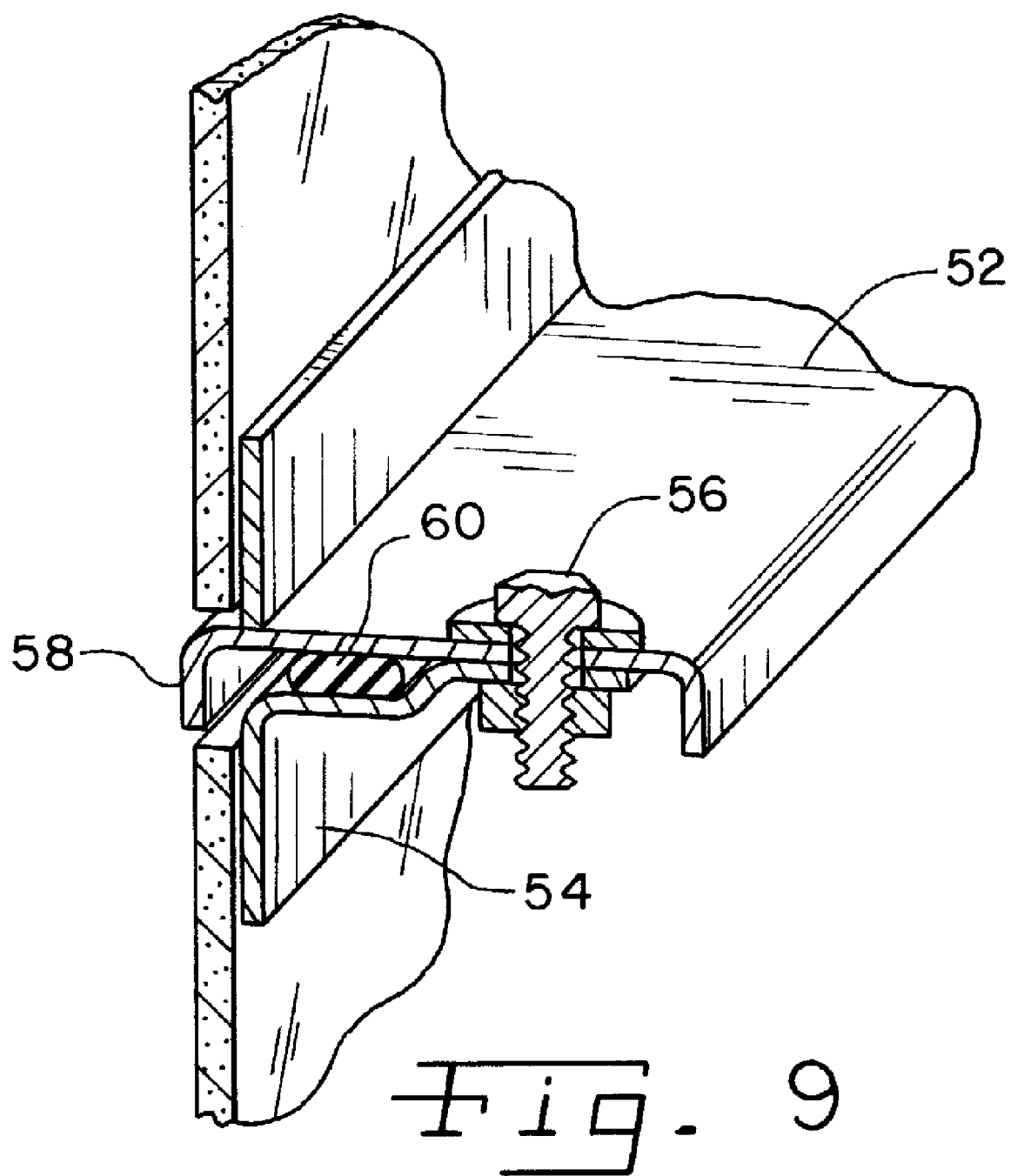
FIG. 9 illustrates an embodiment of a window flange used in the ROPS of the present invention.

Each window 26 is sized to span between adjacent upright support posts 22, including rear corner posts 30, front corner posts 32 and door posts 34. Each window 26 includes an upper window section 48 and a lower window section 50 which are detachably coupled together to allow upper window sections 48 to be removed with corresponding upper post sections 30B, 32B and 34B during disassembly for transport. Each upper window section 48 includes an upper mounting flange 52 positioned at the bottom edge thereof and extending between adjacent upright posts 22. Similarly, each lower window section 50 has a lower mounting flange 54 positioned at the upper edge thereof and extending between adjacent upright support posts 22. Upper mounting flange 52 and lower mounting flange 54 are detachably coupled together, such as by using fasteners 56 shown in FIG. 9. Upper mounting flange 52 includes an overhang 58 which provides the dual functionality of creating a water shed relative to lower window section 50 when the upper half of ROPS 20 is installed, and protecting the lower edge of upper window section 48 from physical damage when the upper half of ROPS 20 is removed for transport. An environmental seal 60 is positioned between each upper mounting flange 52 and lower mounting flange 54, and may be of any suitable configuration.

Each door 28 is of single piece construction, and is removably attached to an adjacent front corner post 32 or door posts 34 using a detachable hinge 62. Hinge 62 may include a hinge plate (see FIG. 1) which is fastened to a corresponding front corner post 32 or door post 34, or may include a removable hinge pin, etc.

Although operator cab 14 is shown with two doors 28 in the embodiment illustrated in the drawings, it is of course also possible to provide operator cab 14 with a single door 28, depending upon the application. Moreover, for certain applications, it may be desirable for operator cab 14 not to include doors 28 or windows 26 (such as may be the case if work machine 10 is used in a hot environment and does not include air conditioning).

To disassemble the upper portion of operator cab 14, doors 28 are removed and the bolts are removed from coupler plates 38 and 44. As a unit, roof 24, upper post sections 30B, 32B, 34B and upper window sections 48 with attached upper mounting flanges 52 are lifted upwardly from operator cab 14 using a chain hoist, cable hoist, or the like. Removal of the upper portion of operator cab 14 does not affect any of the controls for operation of work machine 10, and an operator may simply sit within the lower portion of operator cab 14 using all of the normal controls, levers, pedals, etc. Work machine 10 is then loaded onto a transport vehicle, such as a C-130 air cargo transport plane, with the upper portion of operator cab 14 removed. Concurrently, the upper portion of operator cab 14 may be placed on a skid and fastened down to prevent any damage during transit. At the end use location, work machine 10 is unloaded from the transport vehicle and the upper half of operator cab 14 is attached to the lower half of operator cab 14 in a reverse manner. When assembled together, rear corner posts 30, front corner posts 32 and door posts 34 define the integral ROPS 20 of operator cab 14.

It will be appreciated that the particular shape of the couple plates 38 and 44, as well as the number of coupler plates used, may vary depending upon the application. Also, the couplers need not necessarily take the form of coupler plates, and may be other suitable types of couplers. Further, the particular configuration of the mating window flanges can vary. Moreover, the doors to the cab are not split but are removed for shipping. However, it is possible that the doors could also be split.

Additionally, the particular location of the split lines relative to upright support post 22 and windows 26 can vary depending upon the application. For example, depending upon the type of work machine and the desired total height of the work machine when ROPS 12 is in a disassembled state, the particular locations of the split lines can vary.

Having described the preferred embodiment, it will become apparent that various modifications can be made without departing from the scope of the invention.

The invention claimed is:
1. A work vehicle, comprising:
a vehicle frame; and
a roll-over protective structure mounted to said frame, said roll-over protective structure including a plurality of upright support posts supporting a roof, each said support post including a lower post section and an upper post section detachably coupled together in an end-to-end arrangement to reduce the height of said roll-over protective structure when said lower and upper post sections are detached.

2. The work vehicle of claim 1, including a plurality of coupler plates, each said coupler plate interconnecting a corresponding said upper post section and lower post section.

3. The work vehicle of claim 2, wherein at least one said coupler plate is positioned on an outside of a corresponding said support post.

4. The work vehicle of claim 2, wherein at least one said coupler plate is positioned on an inside of a corresponding said support post.

5. The work vehicle of claim 4, wherein each said coupler plate which is positioned on an inside of a corresponding said support post does not fill an entire cross section of said corresponding support post.

6. The work vehicle of claim 2, wherein at least one said coupler plate is bolted to at least one of said upper support post and said lower support post.

7. The work vehicle of claim 6, wherein at least one said coupler plate is bolted to a corresponding one of said upper support post and said lower support post, and welded to an other of said upper support post and said lower support post.

8. The work vehicle of claim 6, wherein at least one said coupler plate is bolted to each corresponding said upper support post and said lower support post.

9. The work vehicle of claim 1, further including a plurality of windows, each said window spanning between adjacent said support posts, each said window including an upper window section and a lower window section detachably coupled together.

10. The work vehicle of claim 9, wherein each said upper window section includes an upper mounting flange and each said lower window section includes a lower mounting flange, each said upper mounting flange detachably coupled with a corresponding said lower mounting flange.

11. The work vehicle of claim 10, wherein said upper mounting flange includes an overhang overlying an outside of said lower window section.

12. The work vehicle of claim 10, including a plurality of seals, each said seal positioned between a corresponding said upper mounting flange and said lower mounting flange.

13. The work vehicle of claim 1, wherein said plurality of support posts include four corner posts and at least one door post, and further including at least one door, each said door spanning between a corner post and a corresponding said door post, each said door being removably mounted to one of said corner post and said corresponding door post via detachable hinges.

14. The work vehicle of claim 13, wherein said corner posts have a generally rectangular cross section and each said door post has a generally W shaped cross section.

15. A work vehicle, comprising:
a vehicle frame; and
an operator cab carried by said frame, said operator cab including a plurality of upright support posts supporting a roof, each said support post including a lower post section and an upper post section detachably coupled together in an end-to-end arrangement, and a plurality of windows, each said window spanning between adjacent said support posts, each said window including an upper window section and a lower window section detachably coupled together.

16. The work vehicle of claim 15, including a plurality of coupler plates, each said coupler plate interconnecting a corresponding said upper post section and said lower post section.

17. The work vehicle of claim 16, wherein at least one said coupler plate is positioned on an outside of a corresponding said support post.

18. The work vehicle of claim 16, wherein at least one said coupler plate is positioned on an inside of a corresponding said support post.

19. The work vehicle of claim 18, wherein each said coupler plate which is positioned on an inside of a corresponding said support post does not fill an entire cross section of said corresponding support post.

20. The work vehicle of claim 16, wherein at least one said coupler plate is bolted to at least one of said upper support post and said lower support post.

21. The work vehicle of claim 20, wherein at least one said coupler plate is bolted to a corresponding one of said upper support post and said lower support post, and welded to an other of said upper support post and said lower support post.

22. The work vehicle of claim 20, wherein at least one said coupler plate is bolted to each corresponding said upper support post and said lower support post.

23. The work vehicle of claim 15, wherein each said upper window section includes an upper mounting flange and each said lower window section includes a lower mounting flange, each said upper mounting flange detachably coupled with a corresponding said lower mounting flange.

24. The work vehicle of claim 23, wherein said upper mounting flange includes an overhang overlying an outside of said lower window section.

25. The work vehicle of claim 23, including a plurality of seals, each said seal positioned between a corresponding said upper mounting flange and said lower mounting flange.

26. The work vehicle of claim 15, wherein said plurality of support posts include four corner posts and at least one door post, and further including at least one door, each said door spanning between a corner post and a corresponding said door post, each said door being removably mounted to one of said corner post and said corresponding door post via detachable hinges.

27. A roll-over protective structure for use with a work vehicle, said roll-over protective structure comprising a plurality of upright support posts supporting a roof, each said support post including a lower post section and an upper post section detachably coupled together in an end-to-end arrangement to reduce the height of said roll-over protective structure when said lower and upper post sections are detached.

28. The roll-over protective structure of claim 27, including a plurality of coupler plates, each said coupler plate interconnecting a corresponding said upper post section and said lower post section.

29. The roll-over protective structure of claim 28, wherein at least one said coupler plate is positioned on an outside of a corresponding said support post.

30. The roll-over protective structure of claim 28, wherein at least one said coupler plate is positioned on an inside of a corresponding said support post.

31. The roll-over protective structure of claim 30, wherein each said coupler plate which is positioned on an inside of a corresponding said support post does not fill an entire cross section of said corresponding support post.

32. The roll-over protective structure of claim 27, further including a plurality of windows, each said window spanning between adjacent said support posts, each said window including an upper window section and a lower window section detachably coupled together.

33. The roll-over protective structure of claim 32, wherein each said upper window section includes an upper mounting flange and each said lower window section includes a lower mounting flange, each said upper mounting flange detachably coupled with a corresponding said lower mounting flange.

34. The roll-over protective structure of claim 33, wherein said upper mounting flange includes an overhang overlying an outside of said lower window section.

35. The roll-over protective structure of claim 34, including a plurality of seals, each said seal positioned between a corresponding said upper mounting flange and said lower mounting flange.

36. A method of transporting a work machine, comprising the steps of:

detaching a plurality of upper post sections from a plurality of lower post sections, each of said upper post sections and said lower post sections being a part of a roll-over protective structure having a roof supported by said upper post sections; and, transporting the work machine with the roof and upper post sections of the roll-over protective structure removed.

37. The method of transporting a work machine of claim 36, including the step of attaching the upper section of the roll-over protective structure to the lower section of the roll-over protective structure after transport.

38. The method of transporting a work machine of claim 36, wherein said detaching step includes the substep of unbolting a plurality of coupler plates, each said coupler plate interconnecting a corresponding said upper post section and said lower post section.

39. The method of transporting a work machine of claim 36, wherein said detaching step includes the substep of removing at least one door from said roll-over protective structure.

* * * * *